US008625822B2

(12) United States Patent
Jiang et al.

(10) Patent No.: US 8,625,822 B2
(45) Date of Patent: Jan. 7, 2014

(54) THERMOACOUSTIC DEVICE

(75) Inventors: Kai-Li Jiang, Beijing (CN); Xiao-Yang Lin, Beijing (CN); Lin Xiao, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 7 days.

(21) Appl. No.: 13/337,232

(22) Filed: Dec. 26, 2011

(65) Prior Publication Data

US 2012/0250905 A1 Oct. 4, 2012

Related U.S. Application Data

(63) Continuation of application No. 13/335,041, filed on Dec. 22, 2011.

(30) Foreign Application Priority Data

| Mar. 29, 2011 | (CN) | 2011 1 0076698 |
| Mar. 29, 2011 | (CN) | 2011 1 0076700 |
| Mar. 29, 2011 | (CN) | 2011 1 0076702 |
| Mar. 29, 2011 | (CN) | 2011 1 0076748 |
| Mar. 29, 2011 | (CN) | 2011 1 0076749 |
| Mar. 29, 2011 | (CN) | 2011 1 0076754 |
| Mar. 29, 2011 | (CN) | 2011 1 0076761 |
| Mar. 29, 2011 | (CN) | 2011 1 0076762 |

(51) Int. Cl.
*H04R 25/00* (2006.01)

(52) U.S. Cl.
USPC .......................................... 381/164

(58) Field of Classification Search
USPC ........................... 381/164; 977/737, 742, 932
See application file for complete search history.

(56) References Cited

U.S. PATENT DOCUMENTS

| 7,261,352 B2 * | 8/2007 | Maslov et al. | 294/99.1 |
| 8,300,855 B2 * | 10/2012 | Liu et al. | 381/164 |
| 2009/0243637 A1 * | 10/2009 | Okai et al. | 324/724 |
| 2009/0268563 A1 * | 10/2009 | Jiang et al. | 367/140 |
| 2011/0017921 A1 | 1/2011 | Jiang et al. | |
| 2012/0161106 A1 * | 6/2012 | Kim et al. | 257/29 |
| 2012/0250902 A1 * | 10/2012 | Jiang et al. | 381/164 |

FOREIGN PATENT DOCUMENTS

| CN | 101964292 | 2/2011 |
| JP | 2009-43939 | 2/2009 |
| JP | 2010-52972 | 3/2010 |
| JP | 2011-26194 | 2/2011 |

* cited by examiner

*Primary Examiner* — Brian Ensey
(74) *Attorney, Agent, or Firm* — Altis Law Group, Inc.

(57) ABSTRACT

A thermoacoustic device includes a substrate, a sound wave generator and a signal device. The substrate has a net structure and includes a number of first wires and a number of second wires. The first wires and the second wires are crossed with each other. Each of the first wires includes a composite wire. The composite wire includes a carbon nanotube wire structure and a coating layer wrapping the carbon nanotube wire structure. The sound wave generator is located on a surface of the substrate and includes a graphene layer including at least one graphene. The signal input device is configured to input signals to the sound wave generator.

20 Claims, 24 Drawing Sheets

US 8,625,822 B2

THERMOACOUSTIC DEVICE

RELATED APPLICATIONS

This application is a continuation application of U.S. patent application Ser. No. 13/335,041, filed on Dec. 22, 2011, entitled "THERMOACOUSTIC DEVICE," which claims all benefits accruing under 35 U.S.C. §119 from China Patent Application No. 201110076702.4, filed on Mar. 29, 2011; No 201110076700.5, filed on Mar. 29, 2011; No. 201110076749.0, filed on Mar. 29, 2011; No. 201110076754.1, filed on Mar. 29, 2011; No. 201110076698.1, filed on Mar. 29, 2011; No. 201110076762.6, filed on Mar. 29, 2011; No. 201110076761.1, filed on Mar. 29, 2011; and No. 201110076748.6, filed on Mar. 29, 2011, in the China Intellectual Property Office, the disclosures of which are incorporated herein by reference.

BACKGROUND

1. Technical Field

The present disclosure relates to acoustic devices and, particularly, to a thermoacoustic device.

2. Description of Related Art

Acoustic devices generally include a signal device and a sound wave generator electrically connected to the signal device. The signal device inputs signals to the sound wave generator, such as loudspeakers. A loudspeaker is an electroacoustic transducer that converts electrical signals into sound.

There are different types of loudspeakers that can be categorized according to their working principle, such as electro-dynamic loudspeakers, electromagnetic loudspeakers, electrostatic loudspeakers, and piezoelectric loudspeakers. These various types of loudspeakers use mechanical vibration to produce sound waves. In other words they all achieve "electro-mechanical-acoustic" conversion. Among the various types, the electro-dynamic loudspeakers are the most widely used.

A thermophone based on the thermoacoustic effect was made by H. D. Arnold and I. B. Crandall (H. D. Arnold and I. B. Crandall, "The thermophone as a precision source of sound," Phys. Rev. 10, pp 22-38 (1917)). However, the thermophone adopting the platinum strip produces weak sounds because the heat capacity per unit area of the platinum strip is too high.

What is needed, therefore, is to provide a thermoacoustic device having good sound effect and high efficiency.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
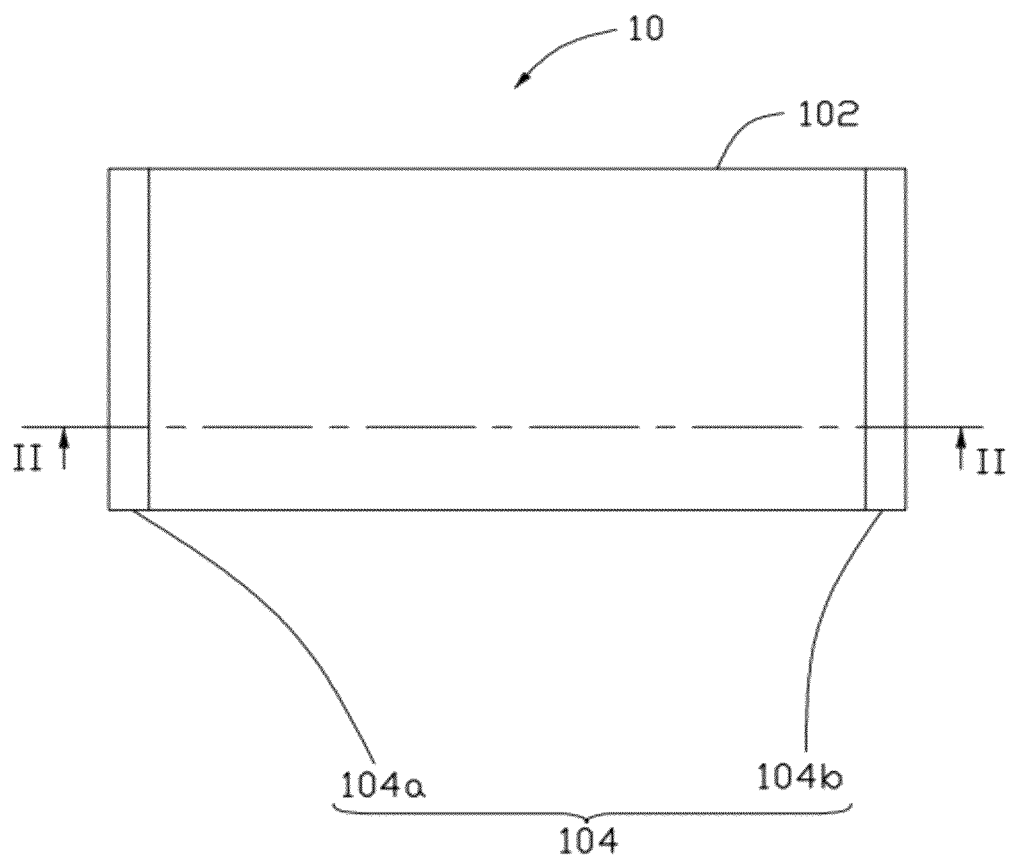
FIG. 1 is a schematic top plan view of one embodiment of a thermoacoustic device.
Figure 2:
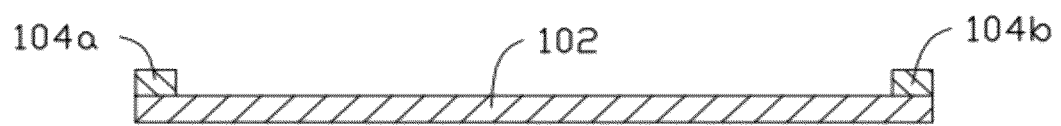
FIG. 2 is a cross-sectional view taken along a line II-II of the thermoacoustic device in FIG. 1.

Referring to FIGS. 1 and 2, a thermoacoustic device 10 in one embodiment includes a sound wave generator 102 and a signal input device 104. The sound wave generator 102 is capable of producing sounds by a thermoacoustic effect. The signal input device 104 is configured to input signals to the sound wave generator 102 to generate heat.

Sound Wave Generator

The sound wave generator 102 has a very small heat capacity per unit area. The sound wave generator 102 can be a conductive structure with a small heat capacity per unit area and a small thickness. The sound wave generator 102 can have a large specific surface area for causing the pressure oscillation in the surrounding medium by the temperature waves generated by the sound wave generator 102. The sound wave generator 102 can be a free-standing structure. The term "free-standing" includes, but is not limited to, a structure that does not have to be supported by a substrate and can sustain the weight of it when it is hoisted by a portion thereof without any significant damage to its structural integrity. That is to say, at least part of the sound wave generator can be suspended. The suspended part of the sound wave generator 102 will have more sufficient contact with the surrounding medium (e.g., air) to have heat exchange with the surrounding medium from both sides of the sound wave generator 102. The sound wave generator 102 is a thermoacoustic film. The sound wave generator 102 has a small heat capacity per unit area and a large surface area for causing the pressure oscillation in the surrounding medium by the temperature waves generated by the sound wave generator 102.

In some embodiments, the sound wave generator 102 can be or include a graphene layer. A thickness of the graphene layer can be less than 10 micrometers. In some embodiments, the thickness of the graphene layer is in a range from about 10 nanometers to about 200 nanometers. The graphene layer includes at least one graphene. The graphene is a one-atom-thick planar sheet of $sp^2$-bonded carbon atoms that are densely packed in a honeycomb crystal lattice. The size of the graphene can be very large (e.g., several millimeters). However, the size of the graphene is generally less than 10 microns (e.g., 1 micron). In one embodiment, the graphene layer is a pure structure of graphene. The graphene layer can be or include a single graphene or a plurality of graphenes. In one embodiment, the graphene layer includes a plurality of graphenes, the plurality of graphenes is stacked with each other or located side by side. The plurality of graphenes is combined with each other by van der Waals attractive force. The graphene layer can be a continuous integrated structure. The term "continuous integrated structure" includes, but is not limited to a structure that is combined by a plurality of chemical covalent bonds (e.g., $sp^2$ bonds, $sp^1$ bonds, or $sp^3$ bonds) to form an overall structure. A thickness of the graphene layer can be less than 1 millimeter. A heat capacity per unit area of the graphene layer can be less than or equal to about $2\times10^{-3}$ $J/cm^2*K$. In some embodiments, a heat capacity per unit area of the graphene layer consisting of one graphene can be less than or equal to about $5.57\times10^{-7}$ $J/cm^2*K$. The graphene layer can be a free-standing structure. The graphene has large specific surface. A transmittance of visible light of the graphene layer can be in a range from 67% to 97.7%.

In other embodiments, the sound wave generator 102 can be or includes a carbon film. The carbon film includes at least one carbon nanotube layer and at least one the graphemne layer. In some embodiments, the carbon film can consist only of the carbon nanotube layer and the graphene layer. The at least one carbon nanotube layer and the at least one graphene are stacked with each other. The carbon film can include a number of carbon nanotube layers and a number of graphene layers alternatively stacked on each other. The carbon nanotube layer and the graphemne layer can combine with each other via van der Waals attractive force. The carbon nanotube layer can include a plurality of micropores defined by adjacent carbon nanotubes, and the graphene layer covers the plurality of micropores. Diameters of the micropores can be in a range from about 1 micrometer to about 20 micrometers. A thickness of the carbon film can be in a range from 10 nanometers to about 1 millimeter. Length and width of the carbon film are not limited.

The carbon nanotube layer includes a number of carbon nanotubes. The carbon nanotube layer can be a pure structure of carbon nanotubes. The carbon nanotubes in the carbon nanotube layer are combined by van der Waals attractive force therebetween. The carbon nanotube layer has a large specific surface area (e.g., above 30 $m^2/g$). The larger the specific surface area of the carbon nanotube layer, the smaller the heat capacity per unit area will be. The smaller the heat capacity per unit area, the higher the sound pressure level of the sound produced by the sound wave generator 102. The thickness of the carbon nanotube layer can range from about 0.5 nanometers to about 1 millimeter. The carbon nanotube layer can include a number of pores. The pores are defined by adjacent carbon nanotubes. A diameter of the pores can be less 50 millimeters, in some embodiment, the diameter of the pores is less 10 millimeters. A heat capacity per unit area of the graphene layer can be less than or equal to about $2\times10^{-3}$ $J/cm^2*K$. In some embodiment, a heat capacity per unit area of the graphene layer can be less than or equal to about $5.57\times10^{-7}$ $J/cm^2*K$.

The carbon nanotubes in the carbon nanotube layer can be orderly or disorderly arranged. The term 'disordered carbon nanotube layer' refers to a structure where the carbon nanotubes are arranged along different directions, and the aligning directions of the carbon nanotubes are random. The number of the carbon nanotubes arranged along each different direction can be almost the same (e.g. uniformly disordered). The carbon nanotubes in the disordered carbon nanotube layer can be entangled with each other. The carbon nanotube layer including ordered carbon nanotubes is an ordered carbon nanotube layer. The term 'ordered carbon nanotube layer' refers to a structure where the carbon nanotubes are arranged in a consistently systematic manner, e.g., the carbon nanotubes are arranged approximately along a same direction and/or have two or more sections within each of which the carbon nanotubes are arranged approximately along a same direction (different sections can have different directions). The carbon nanotubes in the carbon nanotube layer can be single-walled, double-walled, or multi-walled carbon nanotubes. The carbon nanotube layer can include at least one carbon nanotube film. In other embodiments, the carbon nanotube layer is composed of one carbon nanotube film or at least two carbon nanotube films. In other embodiment, the carbon nanotube layer consists of one carbon nanotube film or at least two carbon nanotube films.

Figure 3:
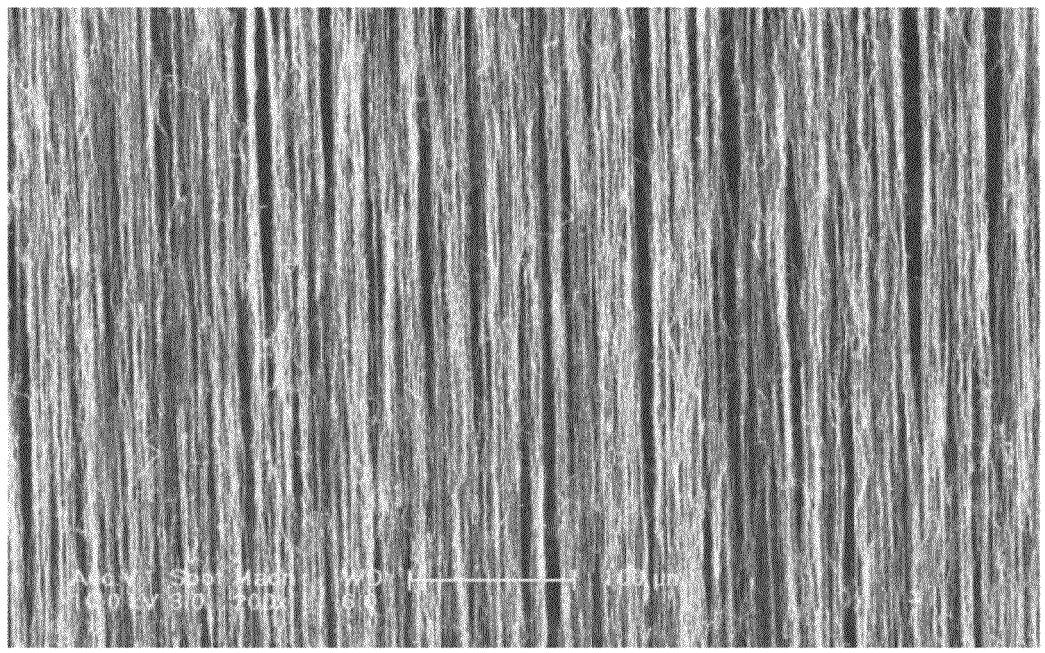
FIG. 3 is a Scanning Electron Microscope (SEM) image of a drawn carbon nanotube film.

In one embodiment, the carbon nanotube film can be a drawn carbon nanotube film. Referring to FIG. 3, the drawn carbon nanotube film includes a number of successive and oriented carbon nanotubes joined end-to-end by van der Waals attractive force therebetween. The drawn carbon nanotube film can have a large specific surface area (e.g., above 100 $m^2/g$). The drawn carbon nanotube film is a freestanding film. Each drawn carbon nanotube film includes a number of successively oriented carbon nanotube segments joined end-to-end by van der Waals attractive force therebetween. Each carbon nanotube segment includes a number of carbon nanotubes substantially parallel to each other, and joined by van der Waals attractive force therebetween. Some variations can occur in the drawn carbon nanotube film. The carbon nanotubes in the drawn carbon nanotube film are oriented along a preferred orientation. The drawn carbon nanotube film can be treated with an organic solvent to increase the mechanical strength and toughness of the drawn carbon nanotube film and reduce the coefficient of friction of the drawn carbon nanotube film. The thickness of the drawn carbon nanotube film can range from about 0.5 nanometers to about 100 micrometers. The drawn carbon nanotube film can be used as a carbon nanotube layer directly.

The carbon nanotubes in the drawn carbon nanotube film can be single-walled, double-walled, or multi-walled carbon nanotubes. The diameters of the single-walled carbon nanotubes can range from about 0.5 nanometers to about 50 nanometers. The diameters of the double-walled carbon nanotubes can range from about 1 nanometer to about 50 nanometers. The diameters of the multi-walled carbon nanotubes can range from about 1.5 nanometers to about 50 nanometers. The lengths of the carbon nanotubes can range from about 200 micrometers to about 900 micrometers.

The carbon nanotube layer can include at least two stacked drawn carbon nanotube films. The carbon nanotubes in the drawn carbon nanotube film are aligned along one preferred orientation, an angle can exist between the orientations of carbon nanotubes in adjacent drawn carbon nanotube films, whether stacked or adjacent. An angle between the aligned directions of the carbon nanotubes in two adjacent drawn carbon nanotube films can range from about 0 degrees to about 90 degrees (e.g. about 15 degrees, 45 degrees or 60 degrees).

Figure 4:
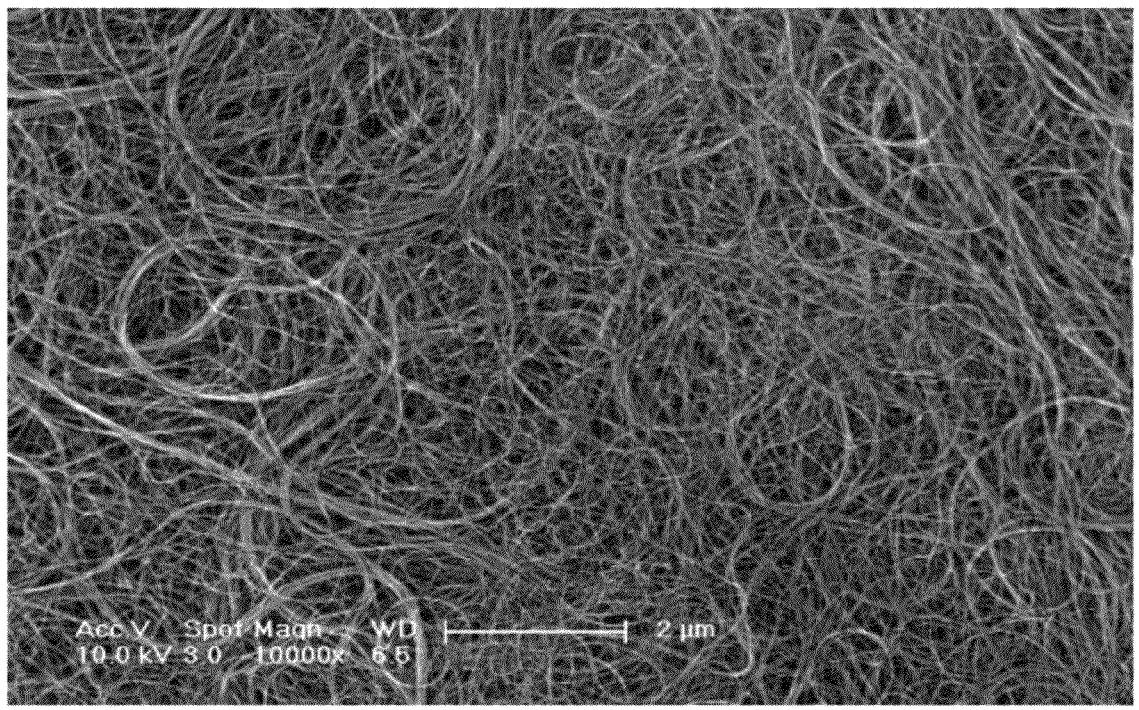
FIG. 4 is an SEM image of a flocculated carbon nanotube film.

In other embodiments, the carbon nanotube film can be a flocculated carbon nanotube film. Referring to FIG. 4, the flocculated carbon nanotube film can include a plurality of long, curved, disordered carbon nanotubes entangled with each other. The carbon nanotubes can be substantially uniformly dispersed in the carbon nanotube film. Adjacent carbon nanotubes are acted upon by van der Waals attractive force to obtain an entangled structure with micropores defined therein. Because the carbon nanotubes in the carbon nanotube film are entangled with each other, the carbon nanotube layer employing the flocculated carbon nanotube film has excellent durability, and can be fashioned into desired shapes with a low risk to the integrity of the carbon nanotube layer. The thickness of the flocculated carbon nanotube film can range from about 0.5 nanometers to about 1 millimeter.

Figure 5:
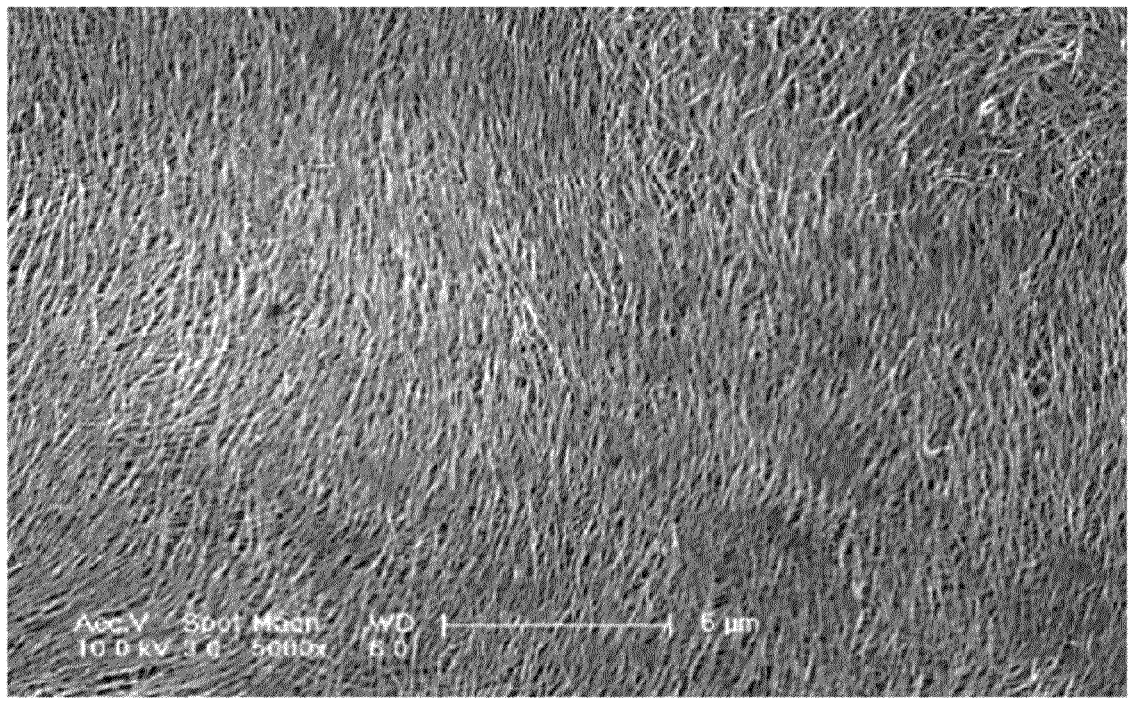
FIG. 5 is an SEM image of a pressed carbon nanotube film.

Referring to FIG. 5, in other embodiments, the carbon nanotube film can be a pressed carbon nanotube film. The pressed carbon nanotube film is formed by pressing a carbon nanotube array. The carbon nanotubes in the pressed carbon nanotube film are arranged along a same direction or along different directions. The carbon nanotubes in the pressed carbon nanotube film can rest upon each other. Adjacent carbon nanotubes are attracted to each other and are joined by van der Waals attractive force. An angle between a primary alignment direction of the carbon nanotubes and a surface of the pressed carbon nanotube film is about 0 degrees to approximately 15 degrees. The greater the pressure applied, the smaller the angle obtained. In one embodiment, the carbon nanotubes in the pressed carbon nanotube film are arranged along different directions, the carbon nanotubes can be uniformly arranged in the pressed carbon nanotube film. Some properties of the pressed carbon nanotube film are the same properties along the direction parallel to the surface of the pressed carbon nanotube film, such as conductivity, intensity, etc. The thickness of the pressed carbon nanotube film can range from about 0.5 nanometers to about 1 millimeter.

Figure 6:
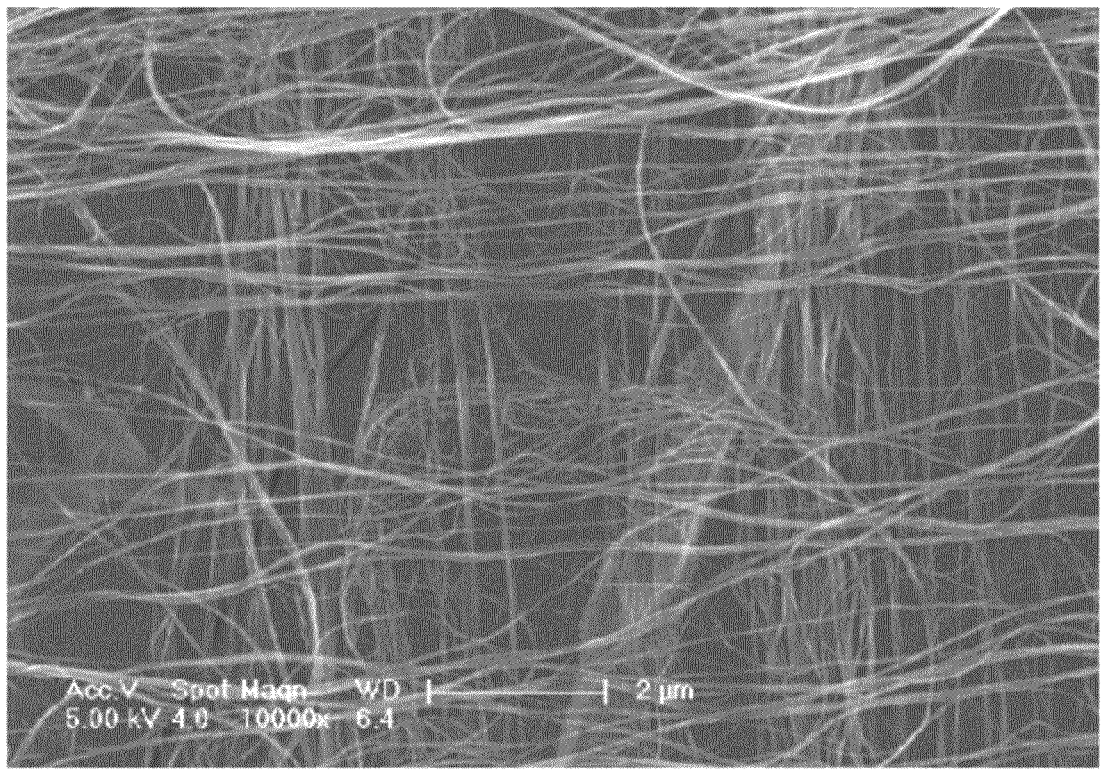
FIG. 6 is an SEM image of a carbon film.
Figure 7:
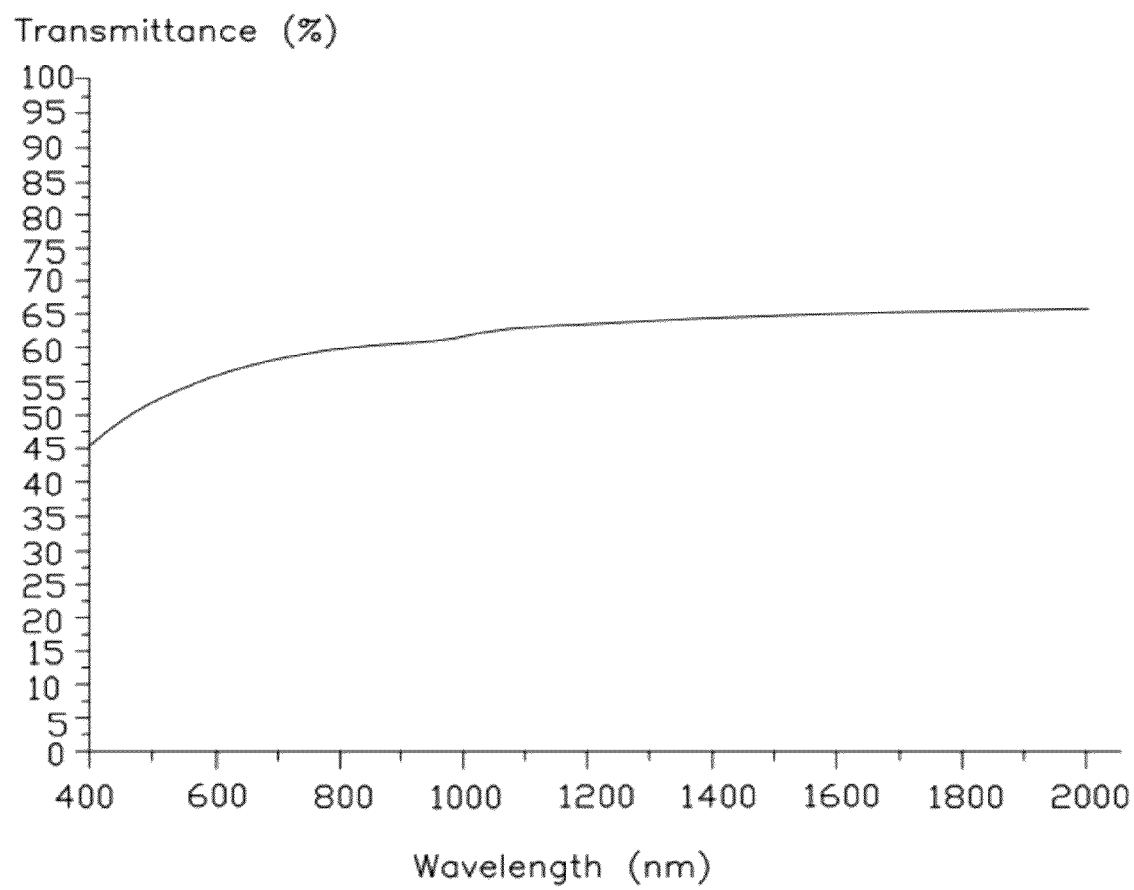
FIG. 7 shows a transmittance graph of an embodiment of the carbon film.

In one embodiment according to FIG. 6, the sound wave generator 102 is a carbon film consisting of one carbon nanotube layer stacked with one graphene layer. The carbon nanotube layer consists of two stacked drawn carbon nanotube films. The angle between the alignment directions of the carbon nanotubes in the two adjacent drawn carbon nanotube films is about 90 degrees. The graphene layer is a single layer of graphene. Referring to FIG. 7, a transmittance of visible light of the carbon film is larger than 60%. The thermoacoustic device 10 using the carbon film as the sound wave generator 102 can be a transparent device.

The graphene layer is very compact, but it has low strength. The carbon nanotube layer has high strength and includes a mount of micropores; and the carbon film including the carbon nanotube layer and the graphene layer has an advantage of compactness and high strength. When the carbon film is used as the sound wave generator 102, because the graphene layer covers the micropores in the carbon nanotube layer, and the carbon film has a larger contacting area with the surrounding medium, the sound wave generator has a higher efficiency. The thickness of the carbon nanotube layer and the graphene layer can be very thin, and a thickness and a heat capacity of the carbon film can be minimal, which makes the sound wave generator have a good sound effect and high sensitivity.

The thermoacoustic device 10 has a wide frequency response range and a high sound pressure level. The sound pressure level of the sound waves generated by an embodiment of the thermoacoustic device 10 can be greater than 50 dB. The frequency response range of the thermoacoustic device 10 can be from about 1 Hz to about 100 KHz with a power input of 4.5 W. The total harmonic distortion of the thermoacoustic device 10 is extremely small, e.g., less than 3% in a range from about 500 Hz to 40 KHz. The thermoacoustic device 10 can be used in many apparatus, such as, telephone, Mp3, Mp4, TV, computer. Further, because the thermoacoustic device 10 can be transparent, it can be stuck on a screen directly.

Energy Generator

The signal input device 104 is used to input signals into the sound wave generator. The signals can be electrical signals, optical signals or electromagnetic wave signals. With variations in the application of the signals and/or strength applied to the sound wave generator 102, the sound wave generator 102 according to the variations of the signals and/or signal strength produces repeated heating. Temperature waves, which are propagated into surrounding medium, are obtained. The surrounding medium is not limited, just to make sure that a resistance of the surround medium is larger than a resistance of the sound wave generator 102. The surrounding medium can be air, water or organic liquid. The temperature waves produce pressure waves in the surrounding medium, resulting in sound generation. In this process, it is the thermal expansion and contraction of the medium in the vicinity of the sound wave generator 102 that produces sound. This is distinct from the mechanism of the conventional loudspeaker, in which the mechanical movement of the diaphragm creates the pressure waves.

In the embodiment according to FIGS. 1 and 2, the signal input device 104 includes a first electrode 104a and a second electrode 104b. The first electrode 104a and the second electrode 104b are electrically connected with the sound wave generator 102 and input electrical signals to the sound wave generator 102. The sound wave generator 102 can produce joule heat. The first electrode 104a and the second electrode 104b are made of conductive material. The shape of the first electrode 104a or the second electrode 104b is not limited and can be lamellar, rod, wire, and block among other shapes. A material of the first electrode 104a or the second electrode 104b can be metals, conductive adhesives, carbon nanotubes, and indium tin oxides among other conductive materials. The first electrode 104a and the second electrode 104b can be metal wire or conductive material layers, such as metal layers formed by a sputtering method, or conductive paste layers formed by a method of screen-printing.

In some embodiments, the first electrode 104a and the second electrode 104b can be a linear carbon nanotube structure. The linear carbon nanotube structure includes a plurality of carbon nanotubes joined end to end. The plurality of carbon nanotubes is parallel with each other and oriented along an axial direction of the linear carbon nanotube structure. In one embodiment, the linear carbon nanotube structure is a pure structure consisting of the plurality of carbon nanotubes.

The first electrode 104a and the second electrode 104b can be electrically connected to two terminals of an electrical signal input device (such as a MP3 player) by a conductive wire. The first electrode 104a and the second electrode 104b can be parallel with each other. If the carbon nanotube layer includes a plurality of carbon nanotubes oriented in a same direction, the direction can be parallel with the first electrode 104a and the second electrode 104b. That is to say, the carbon nanotubes are oriented from the first electrode 104a to the second electrode 104b. Thus, electrical signals output from the electrical signal device can be input into the sound wave generator 102 through the first and second electrodes 104a, 104b. In one embodiment, the sound wave generator 102 is a drawn carbon nanotube film drawn from the carbon nanotube array, and the carbon nanotubes in the carbon nanotube film are aligned along a direction from the first electrode 104a to the second electrode 104b. The first electrode 104a and the second electrode 104b can both have a length greater than or equal to the carbon nanotube film width.

A conductive adhesive layer can be further provided between the first and second electrodes 104a, 104b and the sound wave generator 102. The conductive adhesive layer can be applied to a surface of the sound wave generator 102. The conductive adhesive layer can be used to provide better electrical contact and attachment between the first and second electrodes 104a, 104b and the sound wave generator 102.

The first electrode 104a and the second electrode 104b can be used to support the sound wave generator 102. In one embodiment, the first electrode 104a and the second electrode 104b are fixed on a frame, and the sound wave generator 102 is supported by the first electrode 104a and the second electrode 104b.

Figure 18:
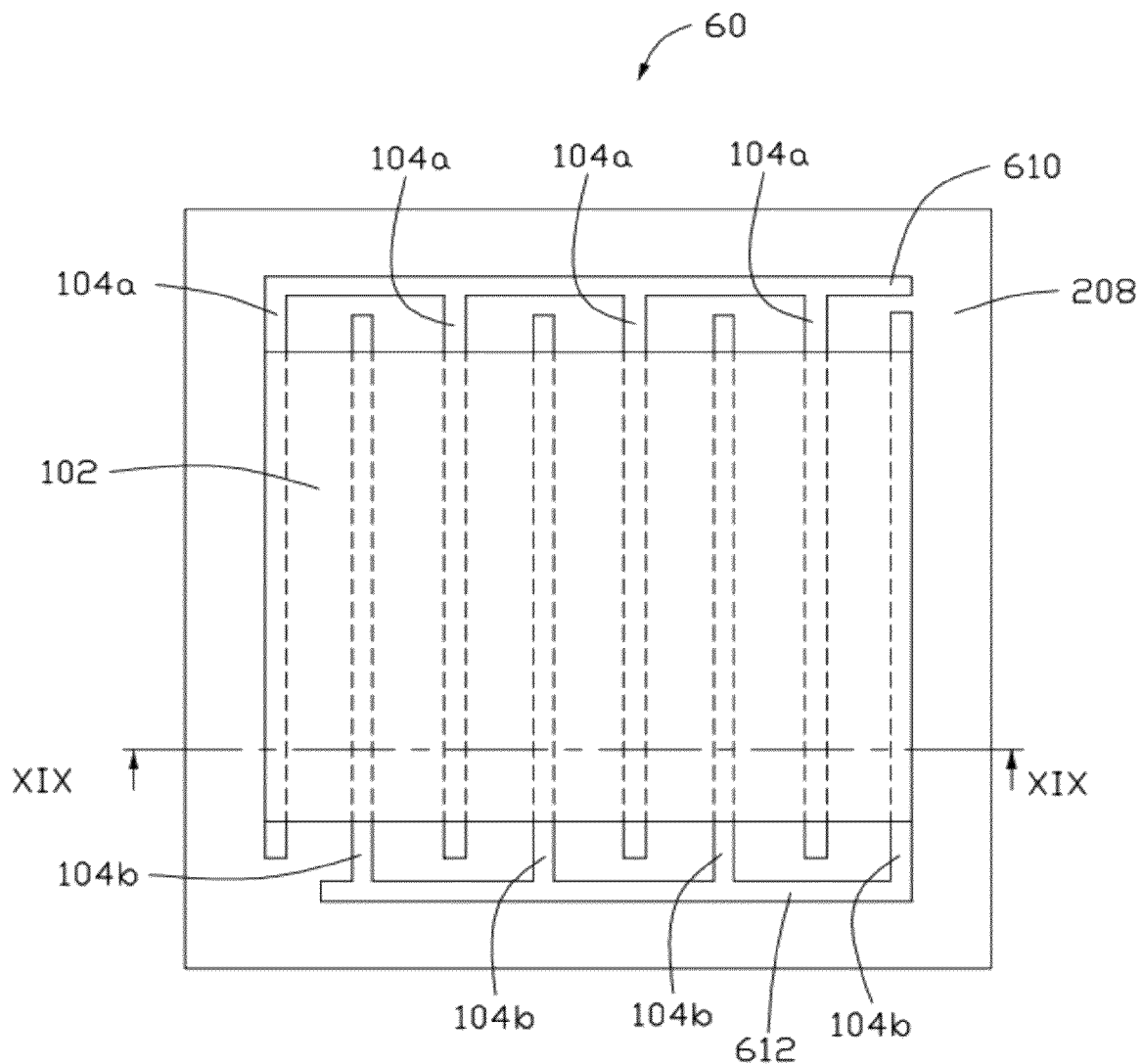
FIG. 18 is a schematic top plan view of one embodiment of a thermoacoustic device.
Figure 19:
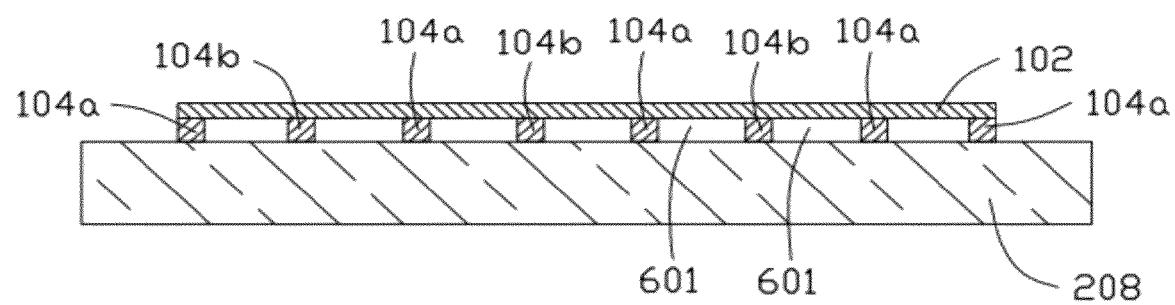
FIG. 19 is a cross-sectional view taken along a line XIX-XIX of the thermoacoustic device in FIG. 18.

In one embodiment according to FIGS. 18 and 19, a thermoacoustic device 60 can include a plurality of alternatively arranged first and second electrodes 104a, 104b. The first electrodes 104a and the second electrodes 104b can be arranged as a staggered manner of +−+−. All the first electrodes 104a are electrically connected together, and all the second electrodes 104b are electrically connected together, whereby the sections of the sound wave generator 102 between the adjacent first electrode 104a and the second electrode 104b are in parallel. An electrical signal is conducted in the sound wave generator 102 from the first electrodes 104a to the second electrodes 104b. By placing the sections in parallel, the resistance of the thermoacoustic device 60 is decreased. Therefore, the driving voltage of the thermoacoustic device 60 can be decreased with the same effect.

The first electrodes 104a and the second electrodes 104b can be substantially parallel to each other with a same distance between the adjacent first electrode 104a and the second electrode 104b. In some embodiments, the distance between the adjacent first electrode 104a and the second electrode 104b can be in a range from about 1 millimeter to about 3 centimeters.

To connect all the first electrodes 104a together, and connect all the second electrodes 104b together, a first conducting member 610 and a second conducting member 612 can be arranged. All the first electrodes 104a are connected to the first conducting member 610. All the second electrodes 104b are connected to the second conducting member 612.

The first conducting member 610 and the second conducting member 612 can be made of the same material as the first and second electrodes 104a, 104b, and can be perpendicular to the first and second electrodes 104a, 104b.

Referring to FIG. 19, the sound wave generator 102 is supported by the first electrode 104a and the second electrode 104b.

Substrate

Referring to FIGS. 18 and 19, the thermoacoustic device 60 can further include a substrate 208, the sound wave generator 102 can be disposed on the substrate 208. The shape, thickness, and size of the substrate 208 is not limited. A top surface of the substrate 208 can be planar or have a curve. A material of the substrate 208 is not limited, and can be a rigid or a flexible material. The resistance of the substrate 208 is greater than the resistance of the sound wave generator 102 to avoid a short circuit through the substrate 208. The substrate 208 can have a good thermal insulating property, thereby preventing the substrate 208 from absorbing the heat generated by the sound wave generator 102. The material of the substrate 208 can be selected from suitable materials including, plastics, ceramics, diamond, quartz, glass, resin and wood. In one embodiment according to FIGS. 18 and 19, the substrate 208 is a glass square board with a thickness of about 20 millimeters and a length of each side of the substrate 208 of about 17 centimeters. In the embodiment according to FIG. 19, the sound wave generator 102 is suspended above the top surface of the substrate 208 via the plurality of first electrodes 104a and the second electrode 104b. The plurality of first electrodes 104a and the second electrodes 104b are located between the sound wave generator 102 and the substrate 208. Part of the sound wave generator 102 is hung in air via the first, second electrodes 104a, 104b. A plurality of interval spaces 601 is defined by the substrate 208, the sound wave generator 102 and adjacent electrodes. Thus, the sound wave generator 102 can have greater contact and heat exchange with the surrounding medium.

Because the graphene layer and the carbon nanotube layer both have large specific surface areas and can be naturally adhesive, the sound wave generator 102 can also be adhesive. Therefore, the sound wave generator 102 can directly adhere to the top surface of the substrate 208 or the first, second electrodes 104a, 104b. When the sound wave generator 102 is the carbon film including at least one carbon nanotube layer and at least one graphene layer, the at least one carbon nanotube layer can directly contact with the surface of the substrate 208 or the first, second electrodes 104a, 104b. Alternatively, the at least one graphene layer can directly contact with the surface of the substrate 208 or the first, second electrodes 104a, 104b.

In other embodiment, the sound wave generator 102 can be directly located on the top surface of the substrate 208, and the first, second electrodes 104a, 104b are located on the sound wave generator. The sound wave generator 102 is located between the first, second electrodes 104a, 104b and the substrate 208. The substrate 208 can further define at least one recess through the top surface. By provision of the recess, part of the sound wave generator 102 can be hung in the air via the recess. Therefore, the part sound wave generator 102 above the recess can have greater contact and heat exchange with the surrounding medium. Thus, the electrical-sound transforming efficiency of the thermoacoustic device 10 can be greater than when the entire sound wave generator 102 is in contact with the top surface of the substrate 208. An opening defined by the recess at the top surface of the substrate 208 can be rectangular, polygon, flat circular, I-shaped, or any other shape. The substrate 208 can define a number of recesses through the top surface. The number of recesses can be parallel to each other. According to different materials of the substrate 208, the recesses can be formed by mechanical methods or chemical methods, such as cutting, burnishing, or etching. A mold with a predetermined shape can also be used to define the recesses on the substrate 208.

Figure 8:
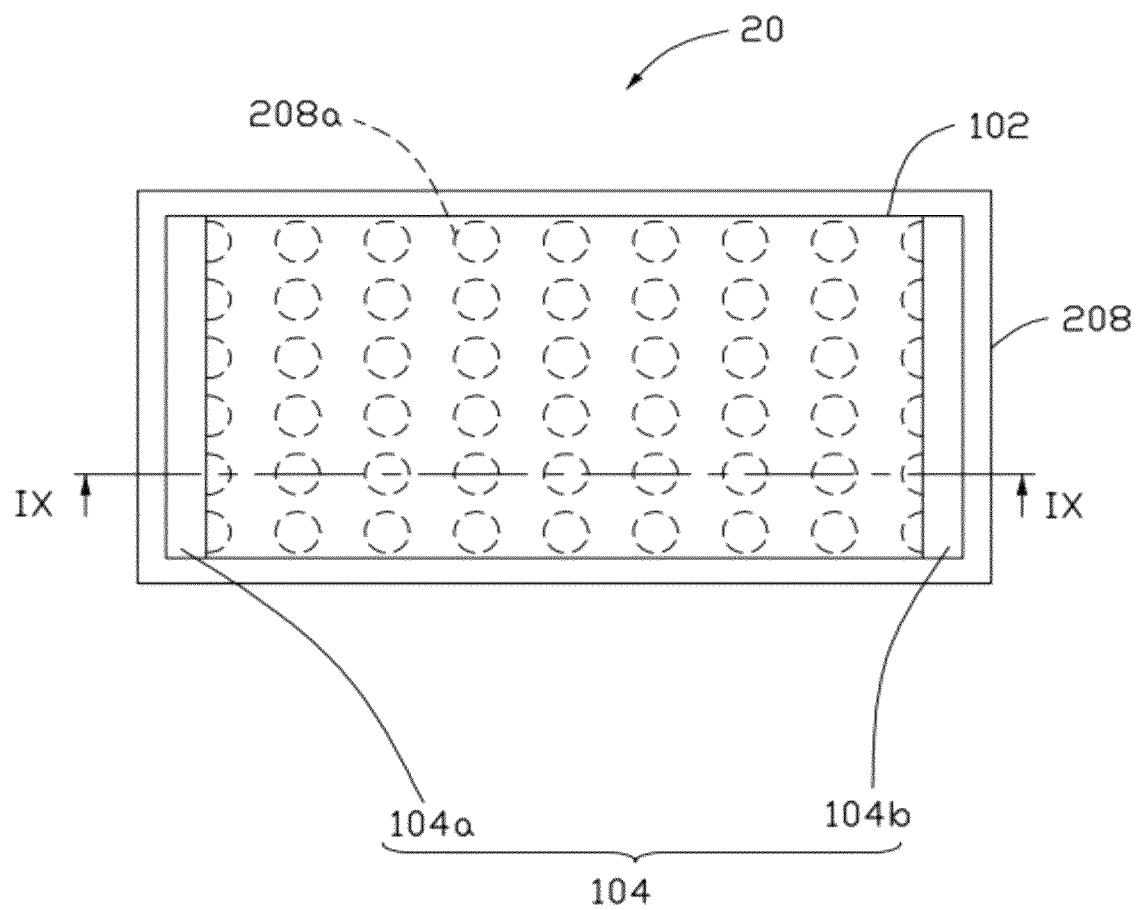
FIG. 8 is a schematic top plan view of one embodiment of a thermoacoustic device.
Figure 9:
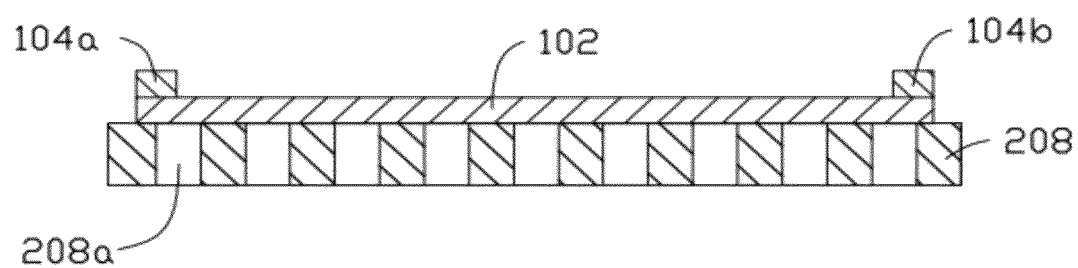
FIG. 9 is a cross-sectional view taken along a line IX-IX of the thermoacoustic device in FIG. 8.

Referring to FIGS. 8 and 9, in one embodiment of a thermoacoustic device 20, each recess 208a is a round through hole. The diameter of the through hole can be about 0.5 μm. A distance between two adjacent recesses 208a can be larger than 100 μm. An opening defined by the recess 208a at the top surface of the substrate 208 can be round. It is to be understood that the opening defined by the recess 208a can also have be rectangular, triangle, polygon, flat circular, I-shaped, or any other shape.

Figure 10:
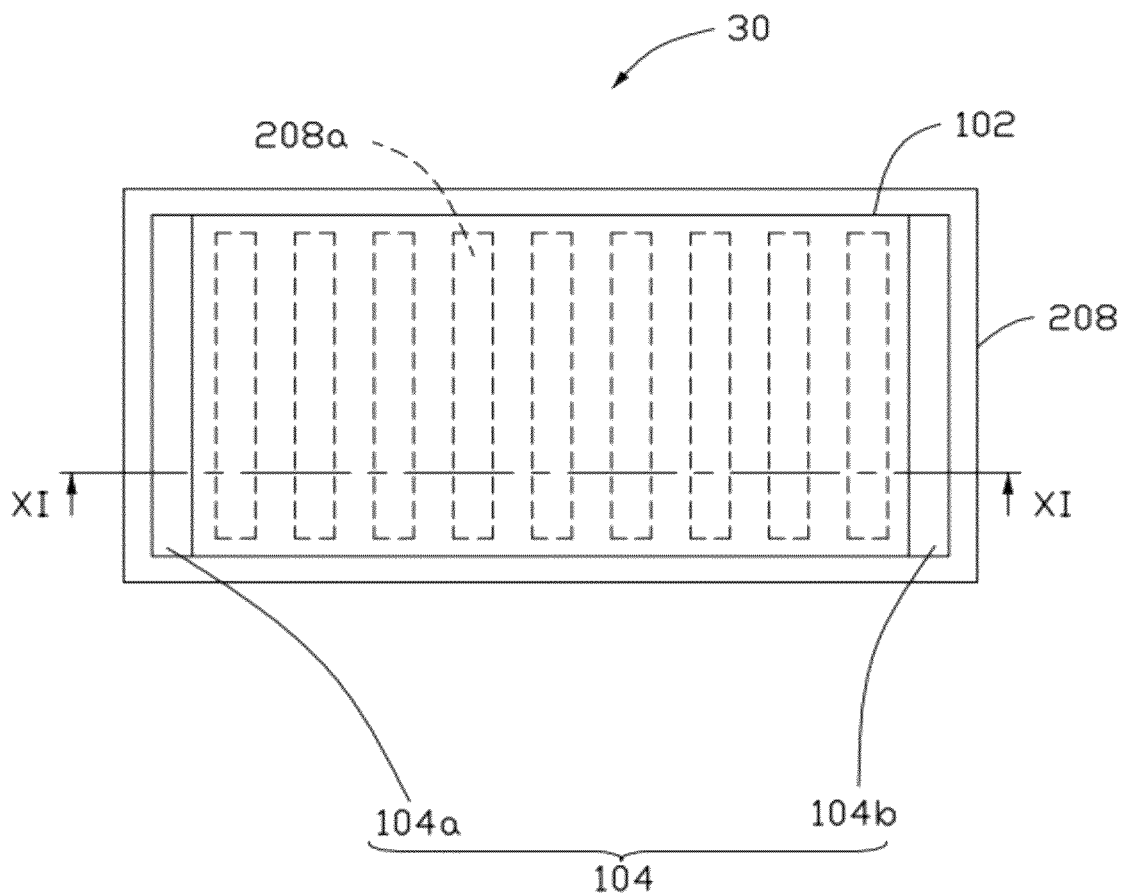
FIG. 10 is a schematic top plan view of one embodiment of a thermoacoustic device.
Figure 11:
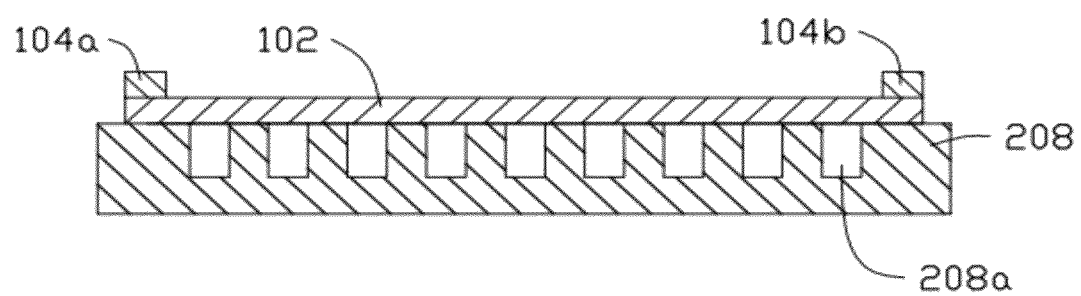
FIG. 11 is a cross-sectional view taken along a line XI-XI of the thermoacoustic device in FIG. 10 according to one example.
Figure 12:
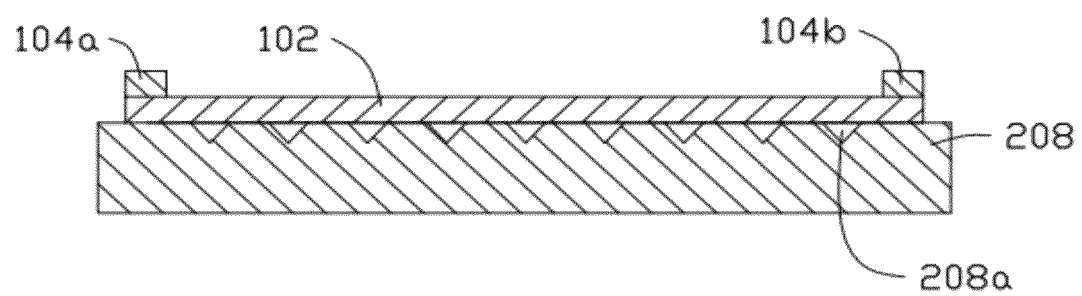
FIG. 12 is a cross-sectional view taken along a line XI-XI of the thermoacoustic device in FIG. 10 according to another example.

In one embodiment of a thermoacoustic device 30 according to FIG. 10, each recess 208a is a groove. The groove can be blind or through. In the embodiment according to FIG. 11, the substrate 208 includes a plurality of blind grooves having square strip shaped openings on the top surface of the substrate 208. In the embodiment according to FIG. 12, the substrate 208 includes a plurality of blind grooves having rectangular strip shaped openings. The blind grooves can be parallel to each other and located apart from each other for the same distance.

Figure 13:
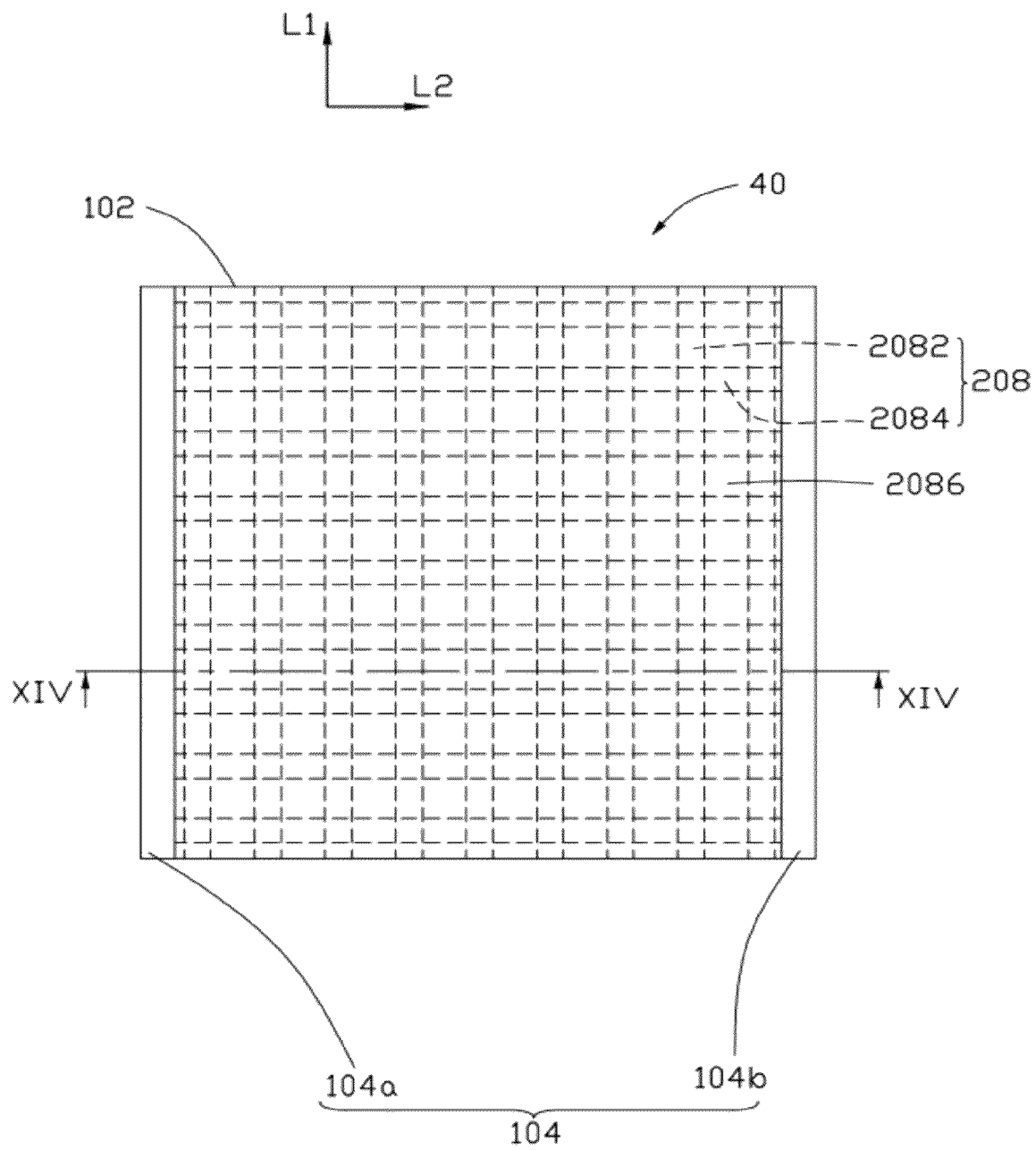
FIG. 13 is a schematic top plan view of one embodiment of a thermoacoustic device.
Figure 14:
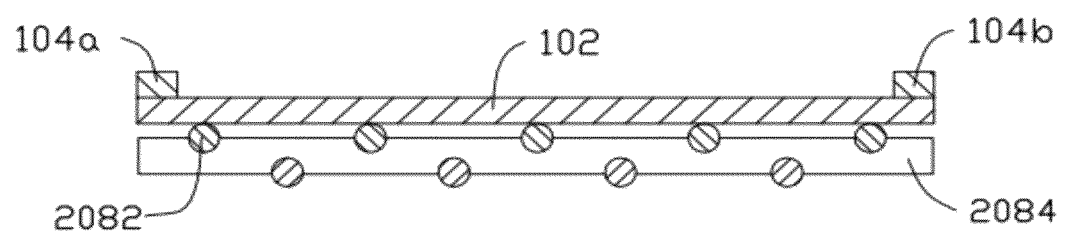
FIG. 14 is a cross-sectional view taken along a line XVI-XVI of the thermoacoustic device in FIG. 13.

Referring to FIG. 13, in one embodiment of a thermoacoustic device 40, the substrate 208 has a net structure. The net structure includes a plurality of first wires 2082 and a plurality of second wires 2084. The plurality of first wires 2082 and the plurality of second wires 2084 cross with each other to form a net-structured substrate 208. The plurality of first wires 2082 is oriented along a direction of L1 and disposed apart from each other. The plurality of second wires 2084 is oriented along a direction of L2 and disposed apart from each other. An angle α defined between the direction L1 and the direction L2 is in a range from about 0 degrees to about 90 degrees. In one embodiment, according to FIG. 13, the direction L1 is substantially perpendicular with the direction L2, e.g. α is about 90 degrees. The first wires 2082 can be located on the same side of the second wires 2084. In the intersections between the first wires 2082 and the second wires 2084, the first wires 2082 and the second wires 2084 are fixed by adhesive or jointing method. If the either one of the first wires 2082 or the second wires 2084 have a low melting point, the first wires 2082 and the second wires 2084 can join with each other by a heat-pressing method. In one embodiment according to FIG. 14, the plurality of first wires 2082 and the plurality of second wires 2084 are weaved together to form the substrate 208 having net structure, and the substrate 208 is an intertexture. On any one of the first wires 2082, two adjacent second wires 2084 are disposed on two opposite sides of the first wire 2082. On any one of the second wires 2084, two adjacent first wires 2082 are disposed on two opposite sides of the second wire 2084.

The first wires 2082 and the second wires 2084 can define a plurality of cells 2086. Each cell 2086 is a through hole having quadrangle shape. In some embodiments, the first wires 2082 are parallel with each other, the second wires 2084 are parallel with each other, and the cell 2086 is a parallelogram. According to the angle between the orientation direction of the first wires 2082 and the second wires 2084 and distance between adjacent first, second wires 2082, 2084, the cells 2086 can be square, rectangle or rhombus.

Diameters of the first wires 2082 can be in a range from about 10 microns to about 5 millimeters. The first wires 2082 and the second wires 2084 can be made of insulated materials, such as plant fiber, plastic, resin, and silica gel. The fiber includes plant fiber, animal fiber, wood fiber, and mineral fiber. The first wires 2082 and the second wires 2084 can be cotton wires, twine, wool, or nylon wires. Particularly, the insulated material can be flexible. Furthermore, the first wires 2082 and the second wire 2084 can be made of conductive materials that are coated with insulated materials. The conductive materials can be metal, alloy or carbon nanotube.

In one embodiment, at least one of the first wire 2082 and the second wire 2084 is made of a composite wire comprising a carbon nanotube wire structure and a coating layer encasing the entire carbon nanotube wire structure. A material of the coating layer can be insulative. The insulative materials can be plastic, rubber or silica gel. A thickness of the coating layer can be in a range from about 1 nanometer to about 10 micrometers.

The carbon nanotube wire structure includes a plurality of carbon nanotubes joined end to end. The carbon nanotube wire structure can be a substantially pure structure of carbon nanotubes, with few impurities. The carbon nanotube wire structure can be a freestanding structure. The carbon nanotubes in the carbon nanotube wire structure can be single-walled, double-walled, or multi-walled carbon nanotubes. A diameter of the carbon nanotube wire structure can be in a range from about 10 nanometers to about 1 micrometer.

The carbon nanotube wire structure includes at least one carbon nanotube wire. The carbon nanotube wire includes a plurality of carbon nanotubes. The carbon nanotube wire can be a pure wire structure of carbon nanotubes. The carbon nanotube wire structure can include a plurality of carbon nanotube wires parallel with each other. In other embodiments, the carbon nanotube wire structure can include a plurality of carbon nanotube wires twisted with each other.

Figure 15:
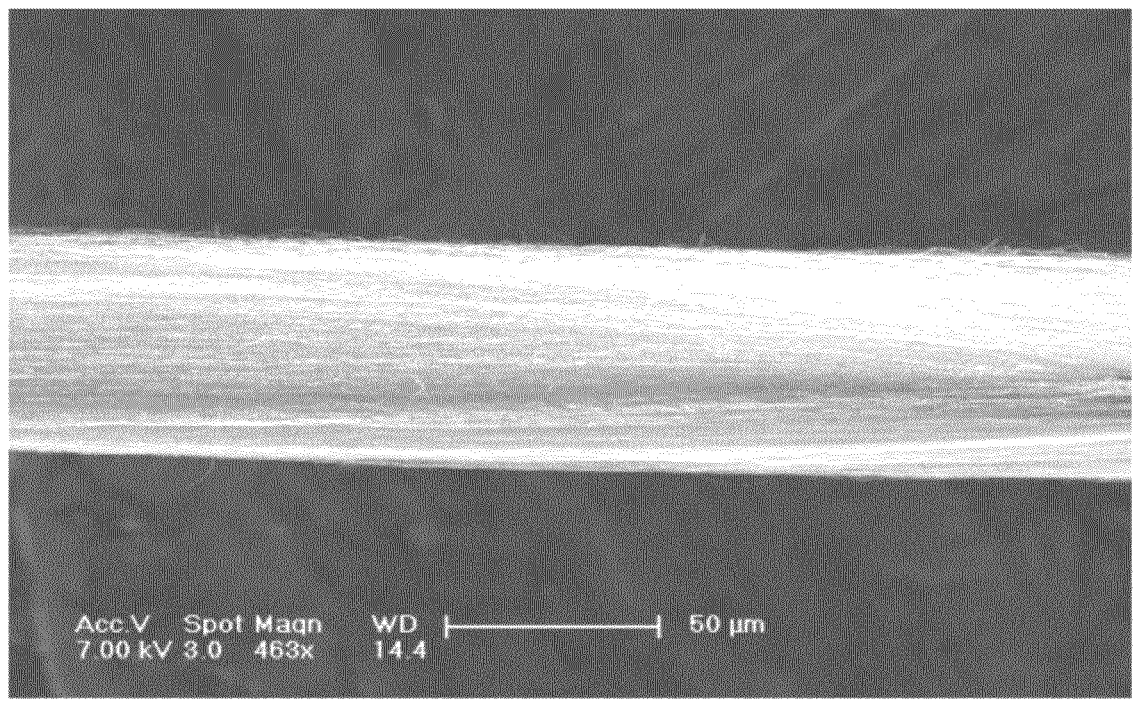
FIG. 15 is an SEM image of an untwisted carbon nanotube wire.

The carbon nanotube wire can be untwisted or twisted. Referring to FIG. 15, the untwisted carbon nanotube wire includes a plurality of carbon nanotubes substantially oriented along a same direction (i.e., a direction along the length direction of the untwisted carbon nanotube wire). The untwisted carbon nanotube wire can be a pure structure of carbon nanotubes. The untwisted carbon nanotube wire can be a freestanding structure. The carbon nanotubes are substantially parallel to the axis of the untwisted carbon nanotube wire. In one embodiment, the untwisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. The carbon nanotube segments can vary in width, thickness, uniformity and shape. Length of the untwisted carbon nanotube wire can be arbitrarily set as desired. A diameter of the untwisted carbon nanotube wire ranges from about 50 nanometers to about 100 micrometers.

Figure 16:
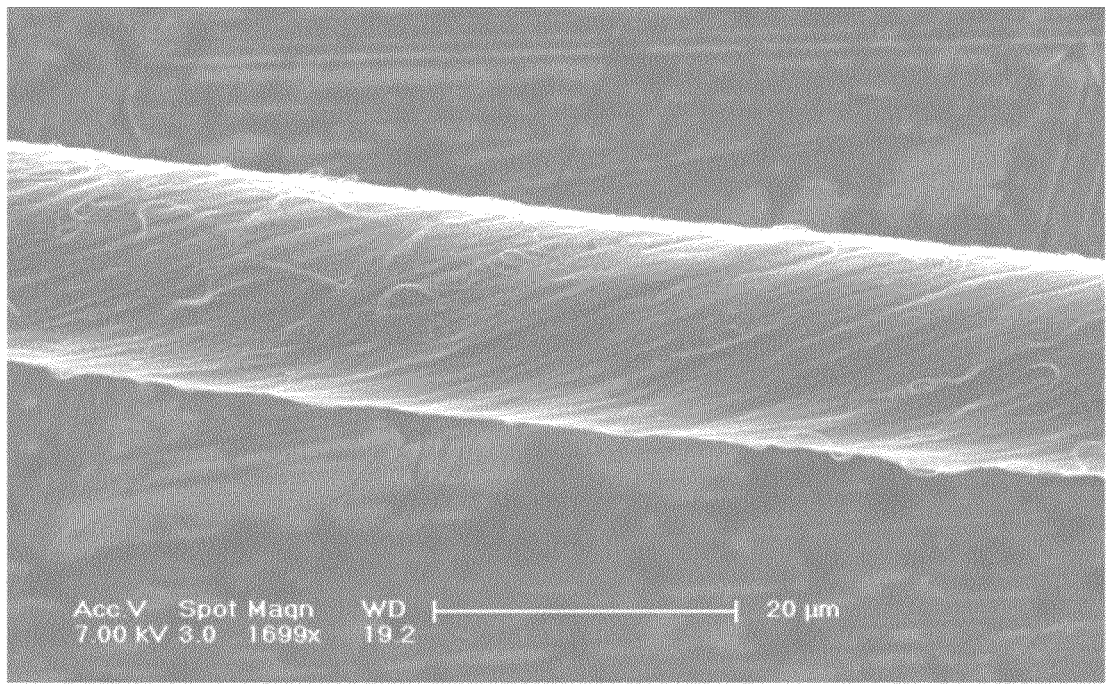
FIG. 16 is an SEM image of a twisted carbon nanotube wire.

Referring to FIG. 16, the twisted carbon nanotube wire includes a plurality of carbon nanotubes helically oriented around an axial direction of the twisted carbon nanotube wire. The twisted carbon nanotube wire can be a pure structure of carbon nanotubes. The twisted carbon nanotube wire can be a freestanding structure. In one embodiment, the twisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. The length of the carbon nanotube wire can be set as desired. A diameter of the twisted carbon nanotube wire can be from about 50 nanometers to about 100 micrometers.

In one embodiment, the first wire 2082 and the second wire 2084 are both composite wires, the composite wire is consisted of a single carbon nanotube wire and the coating layer.

The substrate 208 having net structure has the following advantages. The substrate 208 includes a plurality of cells 2086, therefore, the sound wave generator 102 located on the substrate 208 can have a large contact area with the surrounding medium. When the first wire 2082 or the second wire 2084 is made of the composite wire, because the carbon nanotube wire structure can have a small diameter, the diameter of the composite wire can have a small diameter, thus, the contact area between the sound wave generator and the surrounding medium can be further increased. The net structure can have good flexibility, and the thermoacoustic device 10 can be flexible.

Figure 17:
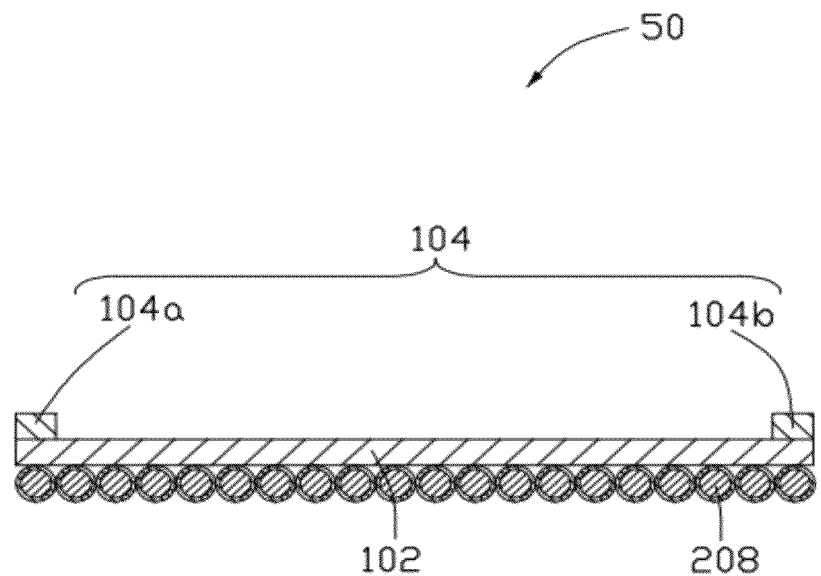
FIG. 17 is a schematic cross-sectional view of one embodiment of a thermoacoustic device including a carbon nanotube composite structure used as a substrate.

Referring to FIG. 17, in a thermoacoustic device 50 according to one embodiment, the substrate 208 can be a carbon nanotube composite structure. The carbon nanotube composite structure includes the carbon nanotube structure and a matrix. The matrix insulates the carbon nanotube structure from the sound wave generator 102. The matrix is located on surface of the carbon nanotube structure. In one embodiment, the matrix encases the carbon nanotube structure, the carbon nanotube structure is embedded in the matrix. In still another embodiment, the matrix is coated on each carbon nanotubes in the carbon nanotube layer, and the carbon nanotube composite structure includes a number of pores defined by adjacent carbon nanotubes coated by the matrix. The size of the pores is less than 5 micrometers. A thickness of the matrix can be in a range from about 1 nanometer to about 100 nanometers. A material of the matrix can be insulative, such as plastic, rubber or silica gel. Characteristics of the carbon nanotube structure are the same as the carbon nanotube layer.

The carbon nanotube composite structure can have good flexibility. When the carbon nanotube composite structure is used as the substrate 208, the thermoacoustic device 10 is flexible. If the carbon nanotube composite structure includes the number of pores, the sound wave generator 102, disposed on the carbon nanotube composite structure, can have a large contacting surface with the surrounding medium.

Spacers

The sound wave generator 102 can be disposed on or separated from the substrate 208. To separate the sound wave generator 102 from the substrate 208, the thermoacoustic device can further include one or some spacers. The spacer is located on the substrate 208, and the sound wave generator 102 is located on and partially supported by the spacer. An interval space is defined between the sound wave generator 102 and the substrate 208. Thus, the sound wave generator 102 can be sufficiently exposed to the surrounding medium and transmit heat into the surrounding medium, therefore the efficiency of the thermoacoustic device can be greater than having the entire sound wave generator 102 contacting with the top surface of the substrate 208.

Figure 20:
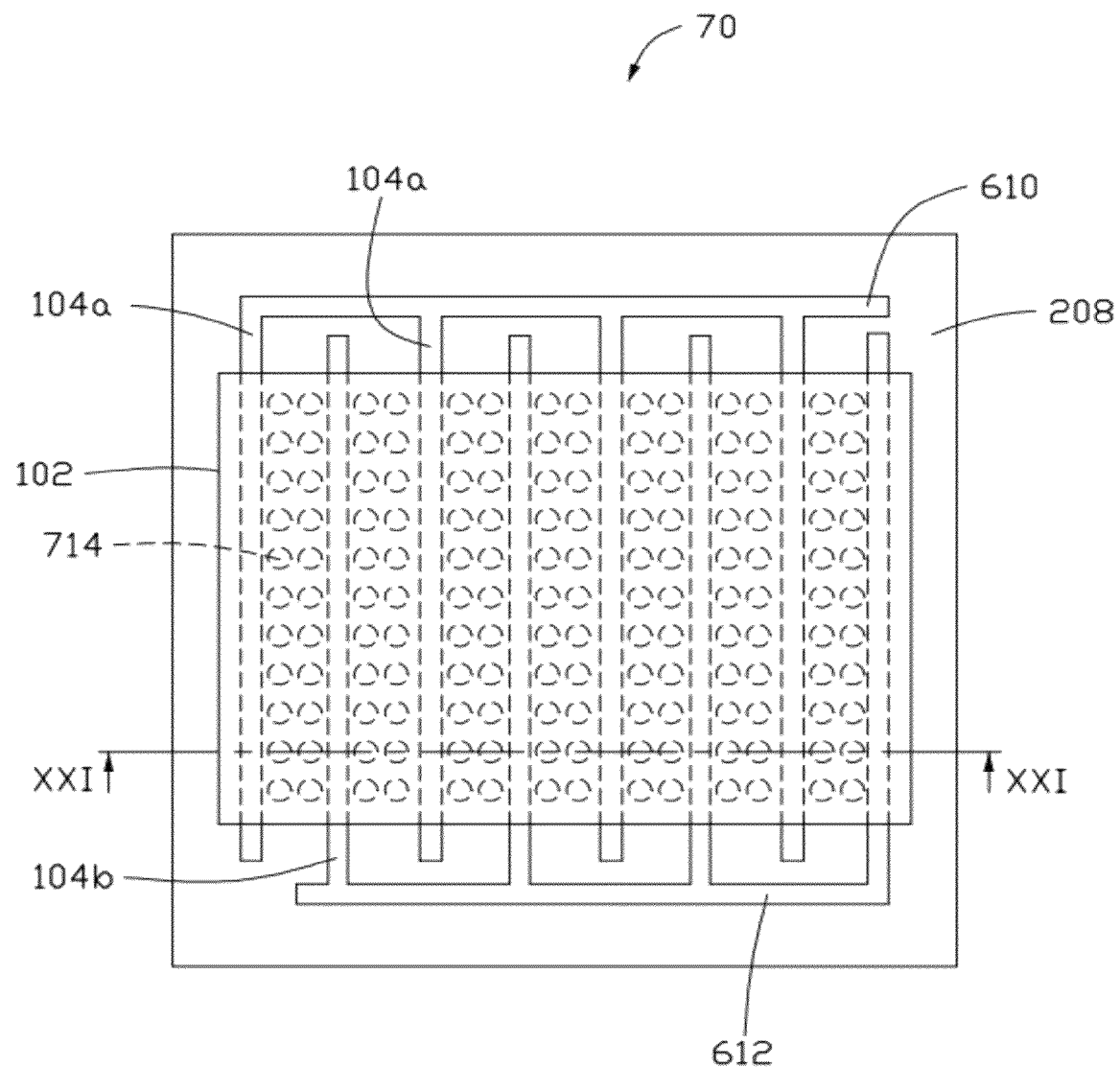
FIG. 20 is a schematic top plan view of one embodiment of a thermoacoustic device.
Figure 21:
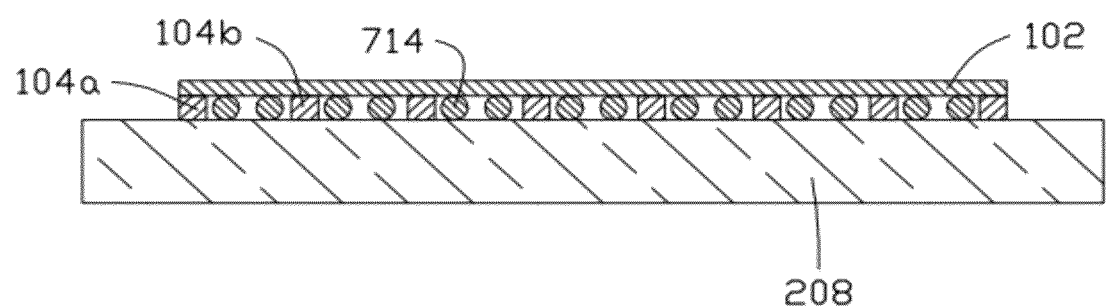
FIG. 21 is a cross-sectional view taken along a line XXI-XXI of the thermoacoustic device in FIG. 20.

Referring to FIGS. 20 and 21, a thermoacoustic device 70 according to one embodiment, includes a substrate 208, a number of first electrodes 104a, a number of second electrodes 104b, a number of spacers 714 and a sound wave generator 102.

The first electrodes 104a and the second electrodes 104b are located apart from each other on the substrate 208. The spacers 714 are located on the substrate 208 between the first electrode 104a and the second electrode 104b. The sound wave generator 102 is located on and supported by the spacer 714 and spaced from the substrate 208. The first electrodes 104a and the second electrodes 104b are arranged on the substrate 208 as a staggered manner of +−+−. All the first electrodes 104a are connected to the first conducting member 610. All the second electrodes 104b are connected to the second conducting member 612. The first conducting member 610 and the second conducting member 612 can be perpendicular to the first and second electrodes 104a, 104b.

The spacers 714 can be located on the substrate 208 between every adjacent first electrode 104a and second electrode 104b and can be apart from each other for a same distance. A distance between every two adjacent spacers 714 can be in a range from 10 microns to about 3 centimeters. The spacers 714, first electrodes 104a and the second electrodes 104b support the sound wave generator 102 and space the sound wave generator 102 from the substrate 208.

The spacer 714 can be integrated with the substrate 208 or separate from the substrate 208. The spacer 714 can be attached to the substrate 208 via a binder. The shape of the spacer 714 is not limited and can be dot, lamellar, rod, wire, and block among other shapes. When the spacer 714 has a linear shape such as a rod or a wire, the spacer 714 can be parallel to the electrodes 104a, 104b. To increase the contacting area of the sound wave generator 102, the spacer 714 and the sound wave generator 102 can be line-contacts or point-contacts. A material of the spacer 714 can be conductive materials such as metals, conductive adhesives, and indium tin oxides among other materials. The material of the spacer 714 can also be insulating materials such as glass, ceramic, or resin. A height of the spacer 714 is substantially equal to or smaller than the height of the electrodes 104a, 104b. The height of the spacer 714 is in a range from about 10 microns to about 1 centimeter.

A plurality of interval spaces (not labeled) is defined between the sound wave generator 102 and the substrate 208. Thus, the sound wave generator 102 can be sufficiently exposed to the surrounding medium and transmit heat into the surrounding medium. The height of the interval space (not labeled) is determined by the height of the spacer 714 and first and second electrodes 104a, 104b. In order to prevent the sound wave generator 102 from generating standing wave, thereby maintaining good audio effects, the height of the interval space 2101 between the sound wave generator 102 and the substrate 208 can be in a range of about 10 microns to about 1 centimeter.

In one embodiment, as shown in FIGS. 20 and 21, the thermoacoustic device 70 includes four first electrodes 104a, and four second electrodes 104b. There are two lines of spacers 714 between the adjacent first electrode 104a and the second electrode 104b.

In one embodiment, the spacer 714, the first electrode 104a and the second electrode 104b have a height of about 20 microns, and the height of the interval space between the sound wave generator 102 and the substrate 208 is about 20 microns.

It is to be understood that, the sound wave generator 102 is flexible. When the distance between the first electrode 104a and the second electrode 104b is large, the middle region of the sound wave generator 102 between the first and second electrodes 104a, 104b may sag and come into contact with the substrate 208. The spacer 714 can prevent the contact between the sound wave generator 102 and the substrate 208. Any combination of spacers 714 and electrodes 104a, 104b can be used.

Thermoacoustic Device Including at Least Two Sound Wave Generators

Figure 22:
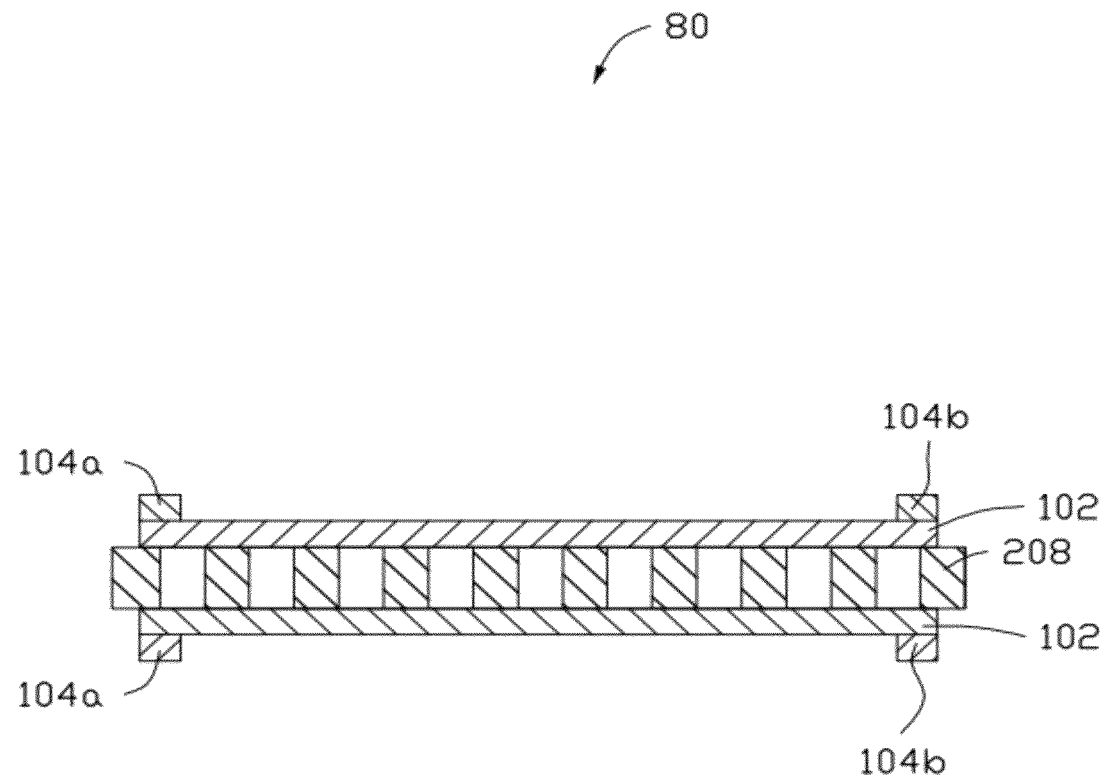
FIG. 22 is a cross-sectional side view of one embodiment of a thermoacoustic device.

Referring to FIG. 22, a thermoacoustic device 80 according to one embodiment, includes a substrate 208, two sound wave generators 102, two first electrodes 104a and two second electrodes 104b.

The substrate 208 has a first surface (not labeled) and a second surface (not labeled). The first surface and the second surface can be opposite with each other or adjacent with each other. In one embodiment according to FIG. 22, the first surface and the second surface are opposite with each other.

The substrate 208 further includes a plurality of recesses 208a. In the embodiment according to FIG. 22, each recess 208a is a through hole located between the first surface and the second surface. The plurality of recesses 208a can be parallel with each other.

One sound wave generator 102 is located on the first surface of the substrate 208 and electrically connected with one first electrodes 104a and one second electrodes 104b. The other one sound wave generator 102 is located on the second surface of the substrate 208 and electrically connected with the other one first electrode 104a and the other one second electrode 104b.

Figure 23:
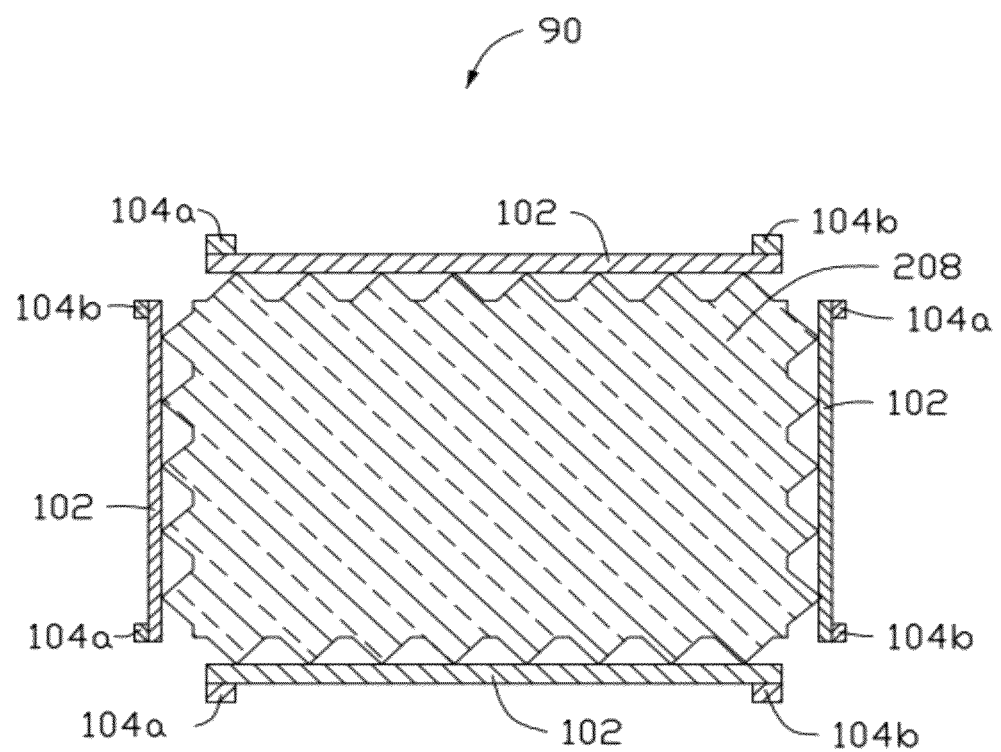
FIG. 23 is a cross-sectional side view of one embodiment of a thermoacoustic device.

Referring to FIG. 23, a thermoacoustic device 90 including a plurality of sound wave generators 102 is provided. The thermoacoustic device 90 includes a substrate 208. The substrate 208 includes a plurality of surfaces, one sound wave generator 102 is located on one surface. The thermoacoustic device 90 can further include a plurality of first electrodes 104a and a plurality of second electrodes 104b. Each sound wave generator 102 is electrically connected with one first electrode 104a and one second electrode 104b. In the embodiment according to FIG. 23, the thermoacoustic device 90 includes four sound wave generators 102, and the substrate 208 includes four surfaces. The four sound wave generators 102 are located on the four surfaces in a one by one manner. The surfaces can be planar, curved or include some protuberances.

The thermoacoustic device including two or more sound wave generators 102 can emit sound waves to two or more different directions, and the sound generated from the thermoacoustic device can spread. Furthermore, if there is something wrong with one of the sound wave generators, the other sound wave generator can still work.

Thermoacoustic Device Using Photoacoustic Effect

In one embodiment, the signal input device 104 can be a light source generating light signals. The light signals can be directly transferred to the sound wave generator 102, and the thermoacoustic device works under a photoacoustic effect. The first and second electrodes 104a, 104b are nod needed. The photoacoustic effect is a kind of the thermoacoustic effect and a conversion between light and acoustic signals due to absorption and localized thermal excitation. When rapid pulses of light are incident on a sample of matter, the light can be absorbed and the resulting energy will then be radiated as heat. This heat causes detectable sound signals due to pressure variation in the surrounding (i.e., environmental) medium.

Figure 24:
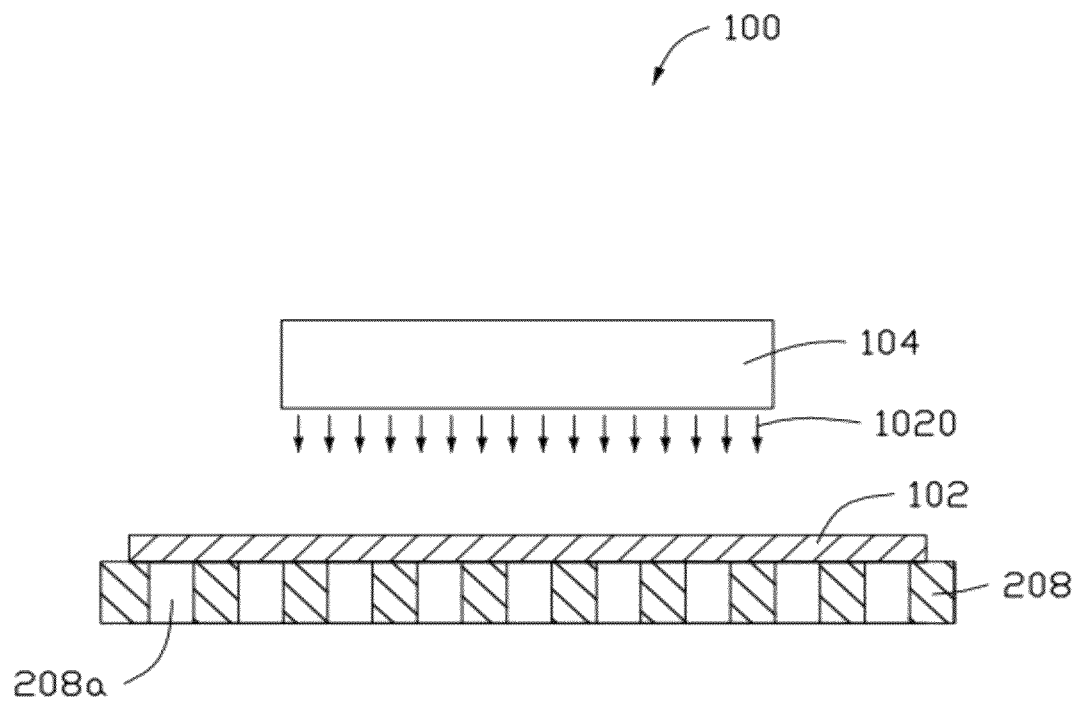
FIG. 24 is a cross-sectional side view of one embodiment of a thermoacoustic device.

Referring to FIG. 24, a thermoacoustic device 100 according to one embodiment includes a signal input device 104, a sound wave generator 102 and a substrate 208, but it does not have the first and second electrodes. In the embodiment shown in FIG. 24, the substrate 208 has a top surface (not labeled) and includes at least one recess 208a. The sound wave generator 102 is located on the top surface of the substrate 208.

The signal input device 104 is located apart form the sound wave generator. The signal input device 104 can be a laser-producing device, a light source, or an electromagnetic signal generator. The signal input device 104 can transmit electromagnetic wave signals 1020 (e.g., laser signals and normal light signals) to the sound wave generator 102. In some embodiments, the signal input device 104 is a pulse laser generator (e.g., an infrared laser diode). A distance between the signal input device 104 and the sound wave generator 102 is not limited as long as the electromagnetic wave signal 1020 is successfully transmitted to the sound wave generator 102.

In the embodiment shown in FIG. 24, the signal input device 104 is a laser-producing device. The laser-producing device is located apart from the sound wave generator 102 and faces to the sound wave generator 102. The laser-producing device can emit a laser. The laser-producing device faces to the sound wave generator 102. In other embodiments, when the substrate 208 is made of transparent materials, the laser-producing device can be disposed on either side of the substrate 208. The laser signals produced by the laser-producing device can transmit through the substrate 208 to the sound wave generator 102.

The sound wave generator 102 absorbs the electromagnetic wave signals 1020 and converts the electromagnetic energy into heat energy. The heat capacity per unit area of the carbon nanotube layer is extremely small, and thus, the temperature of the carbon nanotube layer can change rapidly with the input electromagnetic wave signals 1020 at the substantially same frequency as the electromagnetic wave signals 1020. Thermal waves, which are propagated into surrounding medium, are produced. Therefore, the surrounding medium, such as ambient air, can be heated at an equal frequency as the input of electromagnetic wave signal 1020 to the sound wage generator 102. The thermal waves produce pressure waves in the surrounding medium, resulting in sound wave generation. In this process, it is the thermal expansion and contraction of the medium in the vicinity of the sound wave generator 102 that produces sound. The operating principle of the sound wave generator 102 is the "optical-thermal-sound" conversion.

It is to be understood that the above-described embodiments are intended to illustrate rather than limit the invention. Variations may be made to the embodiments without departing from the spirit of the present disclosure as claimed. Any elements discussed with any embodiment are envisioned to be able to be used with the other embodiments. The above-described embodiments illustrate the scope of the invention but do not restrict the scope of the present disclosure.

What is claimed is:

1. A thermoacoustic device comprising:
a substrate having a net structure and comprising a plurality of first wires and a plurality of second wires, the plurality of first wires and the plurality of second wires crossed with each other, wherein each of the plurality of first wires comprises a composite wire comprising a carbon nanotube wire structure and a coating layer wrapping the carbon nanotube wire structure;
a sound wave generator located on a surface of the substrate, the sound wave generator comprising a graphene layer that comprises at least one graphene; and
a signal input device configured to input signals to the sound wave generator.

2. The thermoacoustic device of claim 1, wherein the graphene layer comprises a plurality of graphenes stacked with each other or located side by side.

3. The thermoacoustic device of claim 1, wherein the graphene layer is a pure structure of graphenes.

4. The thermoacoustic device of claim 1, wherein a thickness of the graphene layer is less than 200 nanometers.

5. The thermoacoustic device of claim 1, wherein a heat capacity per unit area of the graphene layer is less than or equal to $2\times10^{-3}$ J/cm$^2$*K.

6. The thermoacoustic device of claim 1, wherein the signal input device comprises at least one first electrode and at least one second electrode, and the sound wave generator is electrically connected with the at least one first electrode and the at least one second electrode.

7. The thermoacoustic device of claim 6, wherein the signal input device comprises a plurality of first electrodes and a plurality of second electrodes, and the plurality of first electrodes and the plurality of second electrodes are substantially parallel to each other and arranged in a staggered manner.

8. The thermoacoustic device of claim 6, wherein each of the at least one first electrode and the at least one second electrode is a linear carbon nanotube structure comprising a plurality of carbon nanotubes joined end to end with each other.

9. The thermoacoustic device of claim 8, wherein the plurality of carbon nanotubes are parallel with each other and oriented along an axial direction of the linear carbon nanotube structure.

10. The thermoacoustic device of claim 1, wherein the carbon nanotube wire structure comprises a plurality of carbon nanotubes joined end to end with each other.

11. The thermoacoustic device of claim 10, wherein the plurality of carbon nanotubes are parallel with each other and oriented along an axial direction of the carbon nanotube wire structure.

12. The thermoacoustic device of claim 10, wherein the plurality of carbon nanotubes are twisted with each other.

13. The thermoacoustic device of claim 1, wherein a material of the coating layer is insulative.

14. The thermoacoustic device of claim 1, wherein the signal input device is a laser-producing device, a light source, or an electromagnetic signal generator.

15. The thermoacoustic device of claim 1, wherein each of the plurality of second wires comprises the composite wire.

16. The thermoacoustic device of claim 1, wherein the plurality of first wires and the plurality of second wires are woven with each other.

17. The thermoacoustic device of claim 1, wherein the substrate comprises a plurality of cells having quadrangle shapes.

18. A thermoacoustic device comprising:
   a net structure comprising a plurality of cells and a plurality of wires, at least one of the plurality of wires comprising a composite wire that comprises a carbon nanotube wire structure and a coating layer coating the carbon nanotube wire structure;
   a sound wave generator located on a surface of the net structure, the sound wave generator comprising a graphene layer that comprises at least one graphene; and
   a signal input device configured to input signals to the sound wave generator.

19. The thermoacoustic device of claim 18, wherein the signal input device is an electromagnetic wave device capable of sending electromagnetic waves.

20. The thermoacoustic device of claim 18, wherein the carbon nanotube wire structure comprises a plurality of carbon nanotubes joined end to end with each other and oriented along an axial direction of the carbon nanotube wire structure.

* * * * *